(12) United States Patent
Parthasarathy et al.

(10) Patent No.: US 10,673,708 B2
(45) Date of Patent: Jun. 2, 2020

(54) AUTO TUNER FOR CLOUD MICRO SERVICES EMBEDDINGS

(71) Applicant: INTERNATIONAL BUSINESS MACHINES CORPORATION, Armonk, NY (US)

(72) Inventors: Srinivasan Parthasarathy, White Plains, NY (US); Sushma Ravichandran, Yorktown Heights, NY (US); Fabio A. Oliveira, Yorktown Heights, NY (US); Tamar Eilam, New York, NY (US); Priya A. Ashok Nagpurkar, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

(21) Appl. No.: 16/159,597

(22) Filed: Oct. 12, 2018

(65) Prior Publication Data

US 2020/0120000 A1   Apr. 16, 2020

(51) Int. Cl.
*G06F 15/16* (2006.01)
*H04L 12/24* (2006.01)
(Continued)

(52) U.S. Cl.
CPC ...... *H04L 41/5019* (2013.01); *G06F 11/3409* (2013.01); *G06N 20/00* (2019.01); *H04L 67/1002* (2013.01); *H04L 67/1097* (2013.01)

(58) Field of Classification Search
CPC ............ H04L 41/5019; H04L 67/1002; H04L 67/1097; H04L 67/10; H04L 63/0815;
(Continued)

(56) References Cited

U.S. PATENT DOCUMENTS 6,816,954 B2   11/2004  Solomon
8,965,961 B1    2/2015  Roskind et al.
(Continued)

FOREIGN PATENT DOCUMENTS

CN     108021447 A     5/2018
WO   2018/049872 A1    3/2018

OTHER PUBLICATIONS

Cockcroft, A., "The Evolution of Microservices", Battery Ventures, ACM Learning Center Site, Jun. 17, 2016, pp. 1-66.
(Continued)

*Primary Examiner* — Frantz B Jean
(74) *Attorney, Agent, or Firm* — Intelletek Law Group, PLLC; Gabriel Daniel, Esq.

(57) ABSTRACT

A method and system of optimizing parameters of a microservice-based application is provided. A microservice infrastructure of the microservice-based application is determined. One or more optimization objectives related to the microservice-based application are determined. Different combinations of timeout and retry values are tested for each microservice. A reward value is calculated for each of the different combinations of timeout and retry values. The microservice infrastructure is set to a combination of timeout and retry values having a highest reward value for the one or more optimization objectives.

25 Claims, 9 Drawing Sheets

(51) Int. Cl.
*H04L 29/08* (2006.01)
*G06F 11/34* (2006.01)
*G06N 20/00* (2019.01)

(58) Field of Classification Search
CPC . H04L 63/1408; H04L 43/0882; G06N 20/00; G06F 11/3409
USPC .......................................................... 709/203
See application file for complete search history.

(56) References Cited

U.S. PATENT DOCUMENTS

| | | | |
|---|---|---|---|
| 9,652,752 B2 | 5/2017 | Amos | |
| 9,716,617 B1 | 7/2017 | Ahuja et al. | |
| 9,842,045 B2 | 12/2017 | Heorhiadi et al. | |
| 9,906,607 B2 | 2/2018 | Lawson et al. | |
| 2016/0205010 A1 | 7/2016 | Kraev | |
| 2017/0187785 A1* | 6/2017 | Johnson | H04L 67/10 |
| 2017/0324778 A1 | 11/2017 | Register et al. | |
| 2018/0034833 A1* | 2/2018 | Ahuja | H04L 63/1408 |
| 2018/0039570 A1 | 2/2018 | Rajagopalan et al. | |
| 2018/0077144 A1* | 3/2018 | Gangawane | H04L 63/0815 |
| 2018/0095730 A1 | 4/2018 | Anderson et al. | |
| 2018/0157528 A1 | 6/2018 | Gigante et al. | |
| 2018/0181390 A1 | 6/2018 | Lepcha et al. | |
| 2018/0314480 A1* | 11/2018 | Zinchenko | G06F 3/1236 |
| 2018/0331905 A1* | 11/2018 | Toledo | H04L 43/0882 |

OTHER PUBLICATIONS

Richards, M., "Microservices Anti Patterns and Pitfalls", O'Reilly Media, Jul. 6, 2016, pp. 1-61.

Box, C., "Managing Your Microservices With Kubernetes and Isilo", DevOops, Google Cloud, Feb. 16, 2018, pp. 1-43.

Tuffs, P. S., "Feedback Computing: Challenges and Opportunities in Cloud Architectures", Feedback Computing, 10th International Workshop On, Apr. 13, 2015, pp. 1-85.

Mell, P. et al., "Recommendations of the National Institute of Standards and Technology"; NIST Special Publication 800-145 (2011); 7 pgs.

Bu, X. et al., "A Model-free Learning Approach for Coordinated Configuration of Virtual Machines and Appliances" IEEE ( 2011); 10 pgs.

Li, Y. et al., "CAPES: Unsupervised Storage Performance Tuning Using Neural Network-Based Deep Reinforcement Learning"; ACM (2017); 14 pgs.

International Search Report and Written Opinion dated Jan. 2, 2020 issued in related International Patent Application No. PCT/IB2019/058416, filed Oct. 3, 2019; 9 pgs.

Bu, X. et al., "A Reinforcement Learning Approach to Online Web Systems Auto-configuration"; IEEE (2009); 10 pgs.

Bu, X. et al., "Coordinated Self-Configuration of Virtual Machines and Appliances Using a Model-Free Learning Approach"; IEEE (2013); pp. 681-690.

Chen, H. et al., "Boosting the Performance of Computing Systems Through Adaptive Configuration Tuning"; SAC (2009); 5 pgs.

Diao, Y. et al., "Managing Web Server Performance with Auto Tune Agents", IBM Systems Journal (2003); vol. 42:1; pp. 136-149.

Guo, Y. et al., "Automated and Agile Server Parameter Tuning with Learning and Control"; IEEE (2012); pp. 656-667.

Rao, J. et al., "VCONF: A Reinforcement Learning Approach to Virtual Machine Auto-Configuration"; ICAC (2009); 10 pgs.

Saboori, A. et al., "Autotuning Configurations in Distributed Systems for Performance Improvements using Evolutionary Strategies"; IEEE (2008); pp. 769-776.

Xu, C. et al., "URL: A Unified Reinforcement Learning Approach for Autonomic Cloud Management"; JPDC (2012); 15 pgs.

* cited by examiner

AUTO TUNER FOR CLOUD MICRO SERVICES EMBEDDINGS

BACKGROUND

Technical Field

The present disclosure generally relates to network computing, and more particularly, to cloud based distributed applications.

Description of the Related Art

In recent years, the cloud computing platform has emerged as the most popular way of providing a wide range of computational resources, such as infrastructure, platform, and application services. In this regard, various vendors offer cloud-based solutions to optimize the use of their data centers. Modern cloud-based applications are distributed, heterogeneous, and can scale rapidly to respond to demand. This flexibility is facilitated by the use of a fine-grained service-oriented architecture, sometimes referred to as a microservice architecture.

A microservice is a web service that offers a single purpose and exposes a set of APIs to other microservices, which collectively implement a given application. Such applications can be built as a collection of different microservices, instead of a monolithic app. Each microservice of a microservice-based application can run on its own and may be created using different coding or programming languages. Further, each microservice can be developed, deployed, and managed independent of other constituent microservices of the microservice-based application. New features and updates to a microservice can be continuously delivered in a rapid, incremental fashion, wherein newer versions of microservices can be continually integrated into a production deployment. Microservice-based applications developed in this manner are dynamic as they can be updated and deployed frequently.

SUMMARY

According to various embodiments, a computing device, a non-transitory computer readable storage medium, and a method are provided for optimizing parameters of a microservice-based application. A microservice infrastructure of the microservice-based application is determined. One or more optimization objectives related to the microservice-based application are determined. Different combinations of timeout and retry values are tested for each microservice of the microservice-based application. A reward value is calculated for each of the different combinations of timeout and retry values. The microservice infrastructure is set to a combination of timeout and retry values having a highest reward value for the one or more optimization objectives.

In one embodiment, determining the microservice infrastructure of the microservice based application includes identifying microservices used by the microservice-based application and identifying interconnections between the microservices.

In one embodiment, an optimization objective includes a lowest end to end latency within a predetermined maximum error rate for the microservice-based application.

In one embodiment, an optimization objective includes a lowest error rate within a predetermined maximum end to end latency for the microservice-based application.

In one embodiment, the testing of each of the different combinations of timeout and retry values is via a simulator of the microservice-based application.

In one embodiment, the testing of each of the different combinations of timeout and retry values includes testing each combination directly on the microservice-based application.

In one embodiment, the testing of the different combinations of timeout and retry values includes estimating a length of time to test the created different combinations of timeout and retry values directly on the microservice-based application. Upon determining that the length of time is at or below a predetermined threshold, each of the different combinations of timeout and retry values are tested directly on the microservice-based application. However, upon determining that the length of time is above a predetermined threshold, a simulator is used to emulate a performance of the microservice-based application for each of the different combinations of timeout and retry values.

In one embodiment, a correction model is applied to each determined reward value, wherein the correction model takes the determined reward value as input and yields a new estimate of the reward value as output based on statistical and machine learning techniques.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and methods of automatically tuning cloud-based applications having microservices. Microservices applications are based on a distributed architecture, where the services are deployed as separate applications and are accessed remotely through a remote access protocol. Salient considerations of such a distributed architecture include managing the microservices availability and responsiveness. Service availability relates to an ability to connect with a microservice such that an event takes place (e.g., information is received therefrom). On the other hand, service responsiveness, relates to the time it takes for the service to respond to a request once communication is established.

Even though a microservice architecture isolates failures through defined boundaries, there is a high probability of network, hardware, database, or application issues, which can lead to the temporary unavailability of a microservice, collectively referred to herein as a failure of the microservice. If service availability is not provided within a predetermined time, the microservice is subject to a timeout condition, where the request for the microservice is terminated.

A request for a microservice can be repeated a predetermined number of times, referred to herein as a retry. A retry may be effective when errors are transient in nature. For example, a microservice may be temporarily under a heavy load and therefore not respond—but may be available at a subsequent attempt. From the perspective of an end user, the end to end latency should be minimized, regardless of the complexity of the microservice-based application. In this regard, the teachings herein provide methods and systems of automatically adjusting the number of retries and the time elapse between each retry (i.e., timeout) parameters.

By virtue of the concepts discussed herein the computing technology of the cloud is improved. More particularly, microservices of applications are automatically finetuned to improve their performance. The techniques described herein may be implemented in a number of ways. Example implementations are provided below with reference to the following figures.

Example Architecture

Figure 1:
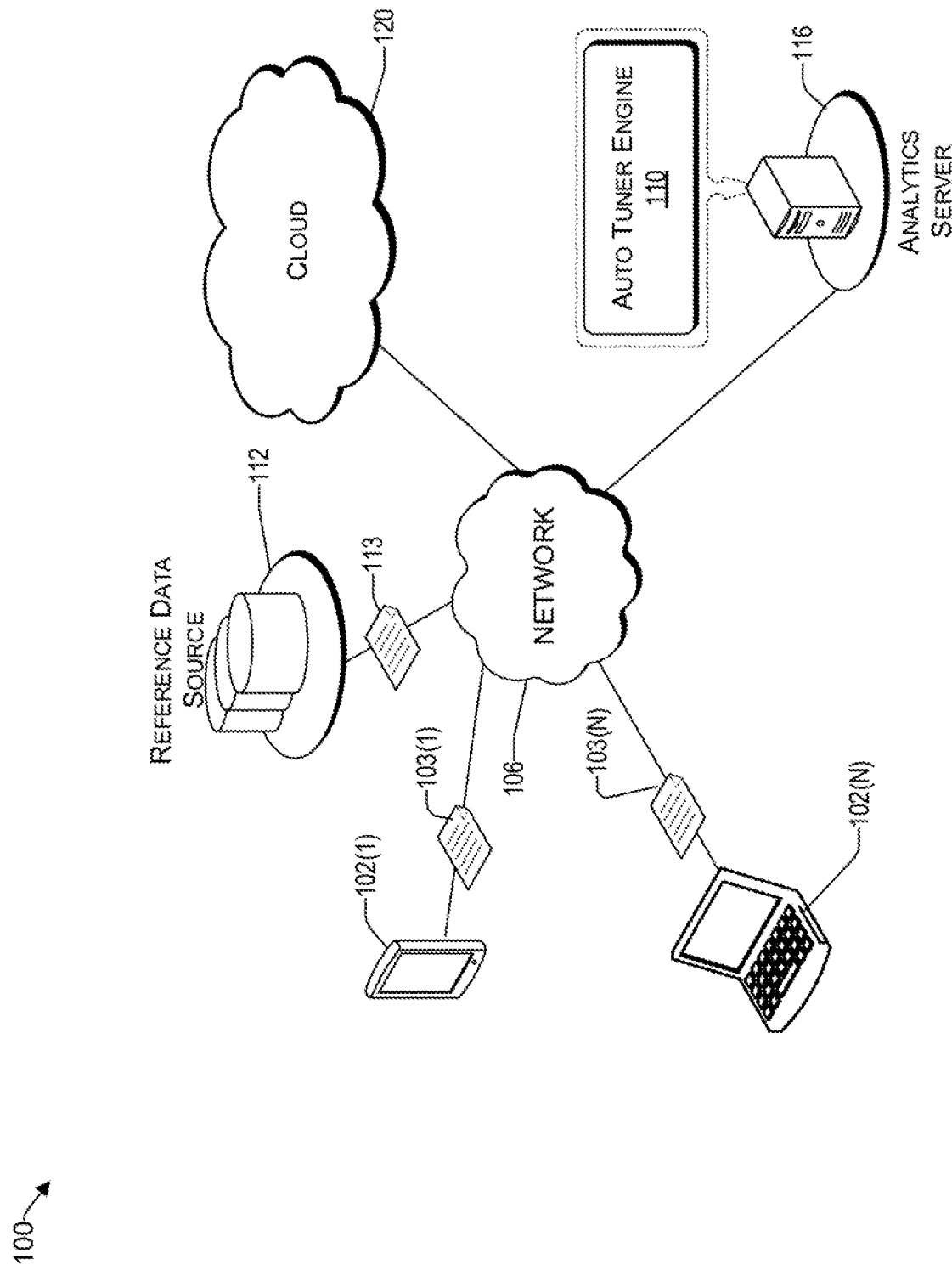
FIG. 1 is an example architecture for implementing a system for automatically tuning microservice-based applications, consistent with an illustrative embodiment.

FIG. 1 is an example architecture 100 for implementing a system for automatically tuning microservice-based applications, consistent with an illustrative embodiment. Architecture 100 includes a network 106 that allows various computing devices 102(1) to 102(N) to communicate with each other, as well as other elements that are connected to the network 106, such as an analytics server 116 and the cloud 120. The network 106 may comprise, without limitation, a global computer network such as the Internet, a wide area network (WAN), a local area network (LAN), a virtual private network (VPN), a satellite network, a telephone or cable network, a cellular network, a wireless network such as Wi-Fi or WiMAX, or various portions or combinations of these and other types of networks (e.g., Internet Protocol (IP) based networks). The network 106 comprises intermediate points (such as routers, switches, etc.), gateways, and other elements that form a network backbone to establish communication paths and enable communication between network endpoints.

The network 106 allows the auto tuner engine 110, which may be a program running on the analytics server 116, to communicate with the reference data source 112, cloud 120, and computing devices 102(1) to 102(N), to provide the automatic tuning of microservices discussed herein. The cloud 120 may comprise a private or public cloud computing system. The various components of the cloud 120 can communicate with each other over the network 106 and/or LANs and WANs that are part of the cloud 120. In one embodiment, the cloud 120 provides a service fabric of microservices that facilitate the operation of complex applications. The architecture of the cloud 120 is discussed in more detail later.

For purposes of later discussion, computing devices 102(1) to 102(N) appear in the drawing, to represent some examples of computing platforms that may be used to represent an end user. Today, computing devices typically take the form of portable handsets, smart-phones, tablet computers, personal digital assistants (PDAs), and smart watches, although they may be implemented in other form factors, including consumer, and business electronic devices. In other embodiments, an end user may be another application and/or microservice. Computing devices 102(1) to 102(N) can be used to generate requests for resources 103(1) to 103(N), which are optimized by the tuner engine 110.

The auto tuner engine 110 of the analytics server 116 is operative to receive requests for a resource (e.g., 103(1)) from end users (e.g., 102(1)). These resources are related to microservice-based application(s) that may be implemented in the cloud 120. For each requested resource, the auto tuner engine 110 is configured to determine the microservices infrastructure related to the requested resource by identifying a network of microservices associated therewith. Each microservice has an associated average delay under different load conditions (e.g., best (light use), nominal (typical use), and worst case (heavy load)). The existing delay for each microservice can be provided by the reference data source 112 as historical data, discussed below.

In some embodiments, a request for a resource includes parameters of a service level agreement (SLA) that defines commitments or constraints that prevail between a service provider associated with the cloud 120 and an account of a customer associated with a computing device (e.g., 102(N)). In other embodiments, such an SLA may be provided by a separate business rules database (not shown) that can be accessed by the auto tuner engine 110 via the network 106. The SLA may be used by the auto tuner engine 110 to identify a maximum error rate, delay, confidence level, computational cost, timeout limit, retry limit, etc., or any combination thereof.

There may be a reference data source 112 that provides training data 113, sometimes referred to herein as historical data, to the auto tuner engine 110. In one embodiment, the auto tuner engine 110 is configured to use algorithms that can learn from and/or make predictions based on a corpus of training data 113 that includes key performance indicators (KPI's) provided by the reference data source 112. The KPI's may include various communication parameters such as, but not limited to, delay between particular microservices at different load conditions, error rate, timeout settings, number of retries that led to success, etc. In some embodiments, the training data can also be from other applications that use the same microservices. Such learning algorithms operate by building a model from the received training data 113 in order to make data-driven predictions or decisions, rather than following strictly static criteria. Machine learning can be used to automatically select optimized timeout and retry values based on the historical data. In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models. Optimization may be implemented by adjusting timeout and retry parameters for each identified microservice of an application, which provides a highest reward value for the application. The concept of reward value is discussed in more detail later.

In various embodiments, the machine learning discussed herein may be supervised or unsupervised. In supervised learning, the auto tuner engine 110 may be presented with example training data 113 of threshold conditions. Stated differently, the training data 113 acts as a teacher for a learning algorithm of the auto tuner engine 110. In unsupervised learning, the training data 113 does not provide any labels as what is acceptable, rather, it simply provides the historic data to the learning algorithm of the auto tuner engine 110 that can be used to find its own structure among the training data 113 to create a model therefrom. In various embodiments, the model of the auto tuner engine 110 can then be used to create a simulator to emulate the performance of the microservice-based application, to create a correction model to correct any simulation and/or physical results, and/or initialize the timeout and retry parameters for each microservice of an application. The correction model takes the determined reward value as input and yields a new estimate of the reward value as output based on statistical and machine learning techniques.

In various embodiments, a highest reward value may be achieved based on error rate, violation of latency constraints, confidence level in the estimates, and other KPIs. For example, different combinations of timeout and retry can be evaluated for each microservice in a network of microservices of an application, such that a lowest end to end latency (i.e., as perceived by the end user computing device (e.g., 102(1))) is achieved, while a threshold error rate is not exceeded. In another embodiment, different combinations of timeout and retry are evaluated such that a lowest error rate is achieved while not exceeding a maximum threshold end to end latency. Accordingly, by virtue of optimizing at least the timeout and retry parameters of each identified microservice, the performance of a microservice-based application is improved while controlling the error rate.

While the reference data source 112 and the analytics server 116 are illustrated by way of example to be on different platforms, it will be understood that in various embodiments, the reference data source 112 and the learning server may be combined. In other embodiments, these computing platforms may be implemented by virtual computing devices in the form of virtual machines or software containers that are hosted in the cloud 120, thereby providing an elastic architecture for processing and storage.

Example Block Diagrams

Figure 2:
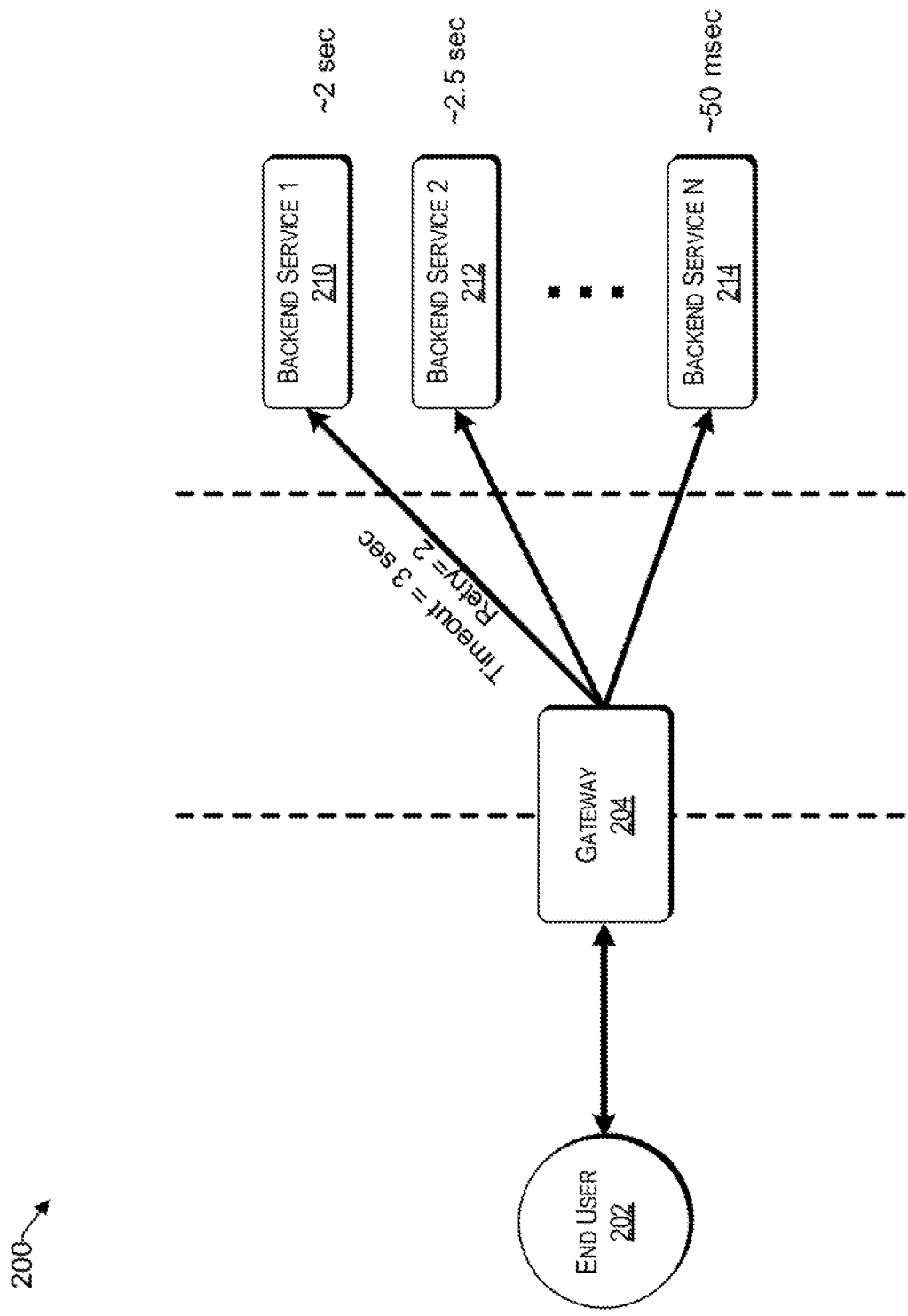
FIG. 2 is a block diagram of a system that uses microservices, consistent with an illustrative embodiment.

Reference now is made to FIG. 2, which is a block diagram of a system that uses microservices, consistent with an illustrative embodiment. The end user 202 may be a user device of or another application. The end user 202 can use the service fabric of the system 200 to fulfil one or more requests for a resource.

The gateway 204, sometimes referred to herein as an ingress, is a front end that provides access to the service fabric of the system 200. For example, the gateway 204 can receive API requests that are related to one or more microservices, represented by way of example in FIG. 2 as Backend Services 1 to N, and then relay the response from the one or more micro services to an appropriate recipient, which may be a computing device or another application (represented by way of example as the end user 202). The gateway 204 can also provide other functions associated with a gateway, such as enforcing security policies, provide throttling, authorization, authentication, audit and regulatory compliance, etc. In one embodiment, the gateway 204 can collect analytics data of delays and/or timeout associated with each Backend Service 1 to N. The gateway can also monitor the end to end latency and error rate, as well as the latency between microservices and corresponding error rate. These KPI's and others can be stored in a reference database, similar to the reference data source 112 of FIG. 1.

For example, an application may be a distributed microservice-based application, which comprises an aggregation of a plurality of different microservices including, for example, a first microservice 210 (e.g., Backend Service 1), a second microservice 212 (e.g., Backend Service 2), etc., up to a $N^{th}$ microservice 214 (e.g., Backend Service N). The microservices 210 to 214 may comprise a collection of distributed fine-grained web services, such as REST-based web services. The microservices 210 to 214 can interact with each other over a communications network using standard application protocols such as HTTP and communication patterns, request-response, publish-subscribe, etc., the semantics of which are well understood. The microservices 210 to 214 are loosely-coupled with one another such that each microservice can be updated and deployed independent of other microservices of an application that uses these microservices 210 to 214, as long as the APIs they invoke are backward compatible. Such loose-coupling can be achieved, for example, using standard application protocols such as HTTP to facilitate easy integration with other microservices.

For example, a microservice-based application may relate, without limitation, to web services or mobile computing services for an end user 202 using the collection of fine-grained microservices 210 to 214. The microservice-based application leverages various managed services provided by a hosting cloud (e.g., similar to that of cloud 120 of FIG. 1) including, for example, managed databases and other types of services such as data analytics, etc. Such applications can also integrate with one or more third-party web services including, for example, a social network, a mobile push notification service, a geo-location service, etc.

In the example of FIG. 2, the specified period of time that will be allowed to elapse in a system before a specified event is to take place (i.e., timeout) is set to 3 seconds for microservice 210. Further, the retries (i.e., number of attempts before an interaction with the microservice is deemed a failure) is limited to 2. Retries provide the ability to invoke previously failed operations. The system 200 will retry the failed operation for a predetermined number of times (e.g., 2 in the present example for microservice 210) and then proceeds to the fallback (recovery) to return the data from a cache or a default value. For example, microservice 210 may not respond due to high load at a time but will be available to communicate with the gateway 204 or any other microservice requesting its service, after a predetermined wait period (e.g., a few seconds) referred to herein as the retry period. In this example, a retry will be helpful in receiving the results from the microservice 210.

However, retrying the service continuously without a meaningful interval may lead to unacceptable delays because the timeout may be shorter than the inherent delay of the microservice 210, thereby leading to repeated fails, ultimately costing time for the end user. To reduce such delay, the timeout limit of 3 seconds provides a cutoff for microservice 210. By providing sufficient time for timeout, excessive delays are avoided due to ineffective retries. In one embodiment, the timeout after each retry increases. Stated differently, the initial timeout may be more aggressive, whereas the second timeout is provided more time to increase the chances of a successful interaction with a microservice.

In one embodiment, there is a recovery mechanism, where a default error response is presented to the end user if a Backend Service (e.g., microservice 210) does not perform within the limits of an SLA. For example, the response may be to retry after a predetermined time period.

It will be understood that each microservice may have a different delay. For example, microservice 210 may have, may have an average delay of 2 sec, whereas another microservice (e.g., 214) may have an average delay of 50 msec. In one aspect, the auto tuner engine discussed herein is configured to optimize retry and timeout values such that the overall latency perceived by the end user 202 is minimized, while a threshold error rate is not exceeded. To that end, the auto tuner engine may include a suite of machine learning techniques that enable end users to not only specify latency constraints through SLA's, but also automatically tune the timeout and retry parameters for each service to minimize system error rates.

Figure 3:
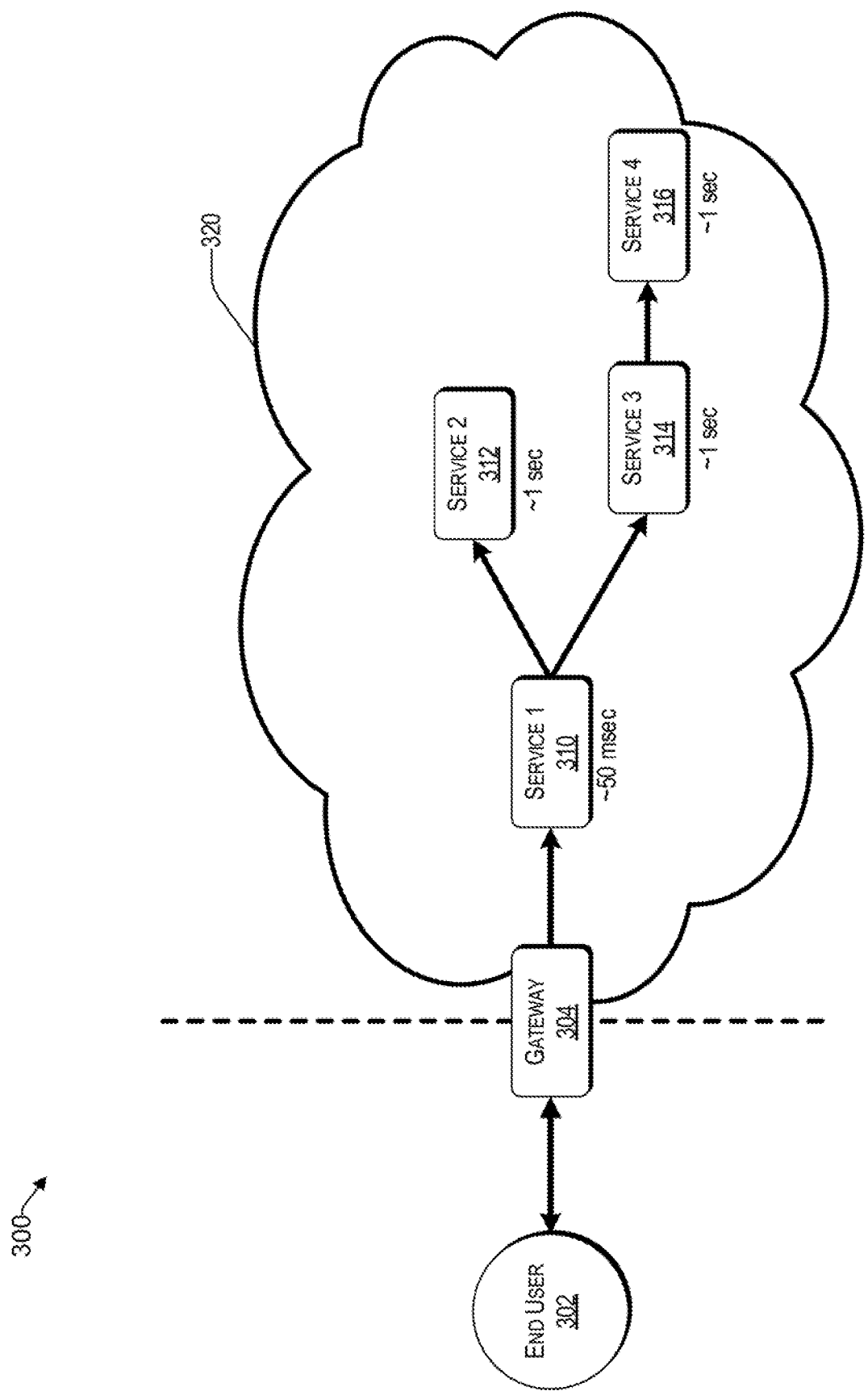
FIG. 3 is a system that includes a mesh of interacting microservices, consistent with an illustrative embodiment.

FIG. 3 is a system that includes a mesh of interacting microservices, consistent with an illustrative embodiment. A request from the end user 302 is received by a gateway 304, which provides access to a service fabric, which may be hosted in the cloud 320. The request may involve a first microservice 310, which is linked to a second microservice 312 and a third microservice 314. The third microservice 314, in turn, is linked to a fourth microservice 316. In the example of FIG. 3, the first microservice 310 has an average delay of about 50 ms, whereas the other microservices experience average delays of 1 sec. The challenge posed by the example scenario 300 is how to optimize the timeout and retry parameters of each microservice individually (i.e., 310 to 316, accordingly), such that an end to end latency is minimized for the end user 302.

Figure 4A:
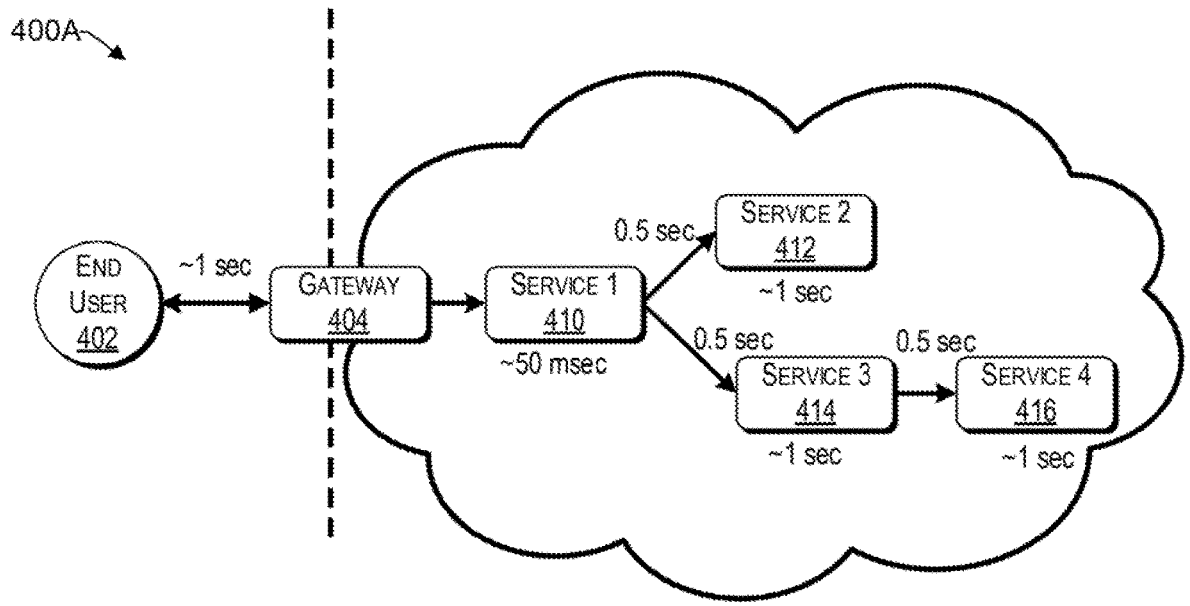
FIGS. 4A and 4B illustrate different settings for timeout in example scenarios.
Figure 4B:
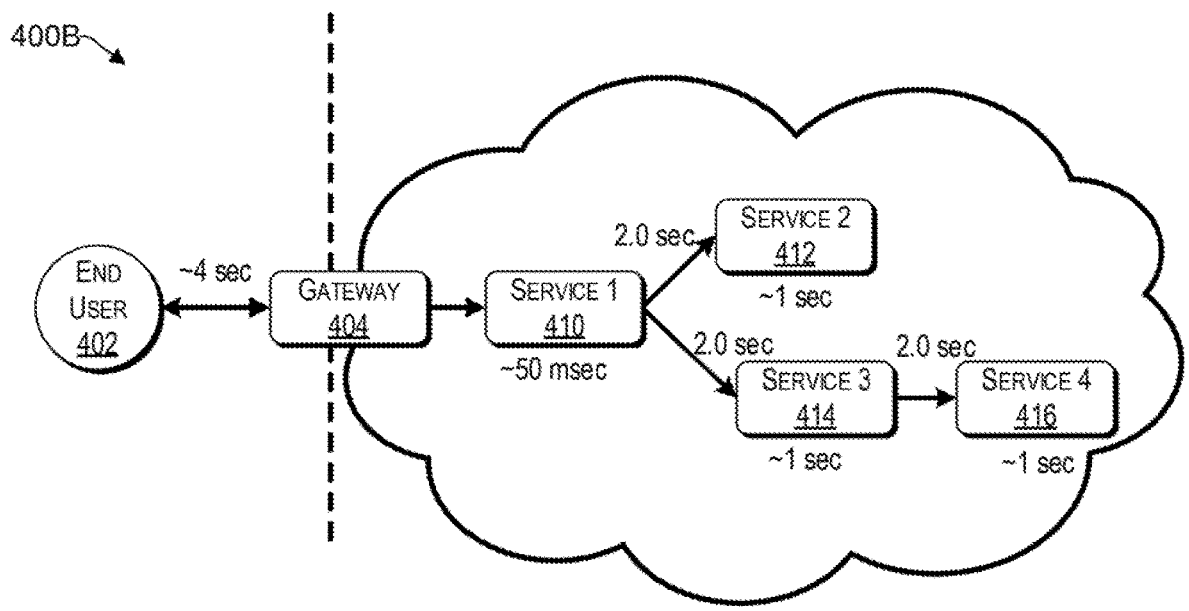

Reference now is made to FIGS. 4A and 4B, which illustrate different settings for timeout in example scenarios. It will be understood that different microservices may have different communication properties and, thus, different delays. For example, the first microservice 410 may relate to a product page and have a small delay of 40 ms under normal conditions. The second microservice 412 may relate to additional details, the third microservice 414 may provide reviews, and the fourth microservice 416 may relate to ratings, each having an average delay of 1 sec under nominal conditions. Further, each microservice may respond differently under different loads. For example, the third microservice 414 may be more severely affected by a heavy load than the fourth microservice 416. These delays may be related to processing, communication latency (e.g., travel across the internet), and failures, which delay the response. The delays may vary significantly between microservices. In this regard, the product page (i.e., microservice 410) can eschew a request to the details microservice (i.e., 412) and to the reviews microservice (i.e., 414). If a response is not received in a predetermined time, the request will timeout. Thus, each requestor microservice is affected by two main parameters, namely (i) timeout and (ii) number of retries.

FIG. 4A represents a scenario where the timeouts for microservices 412, 414, and 416 are set to minimize end to end latency at the expense of a possibly higher error rate. More particularly, by using a timeout of 0.5 seconds between microservices 410 and 412, between microservices 410 and 414, and between microservices 414 and 416 to 0.5 sec, an end to end latency of approximately 1 sec is achieved. However, such aggressive timeout in view of the average delay of each of the microservices 412, 414, and 416 of 1 sec, may come at the expense of a higher error rate that may be perceived by the end user 402. Stated differently, system 400A may be subject to one or more retries to successfully satisfy (if at all) the request for a service for an end user 402.

In contrast, FIG. 4B represents a scenario where the timeouts for microservices 412, 414, and 416 are set to minimize a perceived error rate by the end user 402. To that end, a timeout that is substantially larger than an average delay for each corresponding microservice (e.g., double) is set to mitigate timeout. Accordingly, retries are less likely. However, by using longer timeout periods, while the error rate is reduced, the end to end latency perceived by the end user 402 increases to approximately 4 seconds in the example of FIG. 4B. Accordingly, FIGS. 4A and 4B demonstrate that there is an inverse relationship between timeout and error rate.

The optimal setting for timeout may lie somewhere in between the settings represented by FIGS. 4A and 4B. In the example of FIGS. 4A and 4B, the microservice 410 uses the results of microservices 412 and 414. However, microservice 414 is delayed in the present example by microservice 416. Thus, an aggressive setting for timeout may not be appropriate for microservice 412, since microservice 410 still needs the results of microservices 414 and by extension 416, which are provided later.

In one aspect, the auto tuner engine is configured to evaluate different permutations of timeout and retry for each of the microservices 410 to 416 such that an effective end to end latency perceived by the end user 402 is minimized. For example, the end user and/or SLA 402 may specify a maximum acceptable end to end latency. In turn, the auto tuner engine adjusts the timeout and retry parameters such that the requirement is met with a lowest possible error rate. Alternatively, based on the specifications from the end user 402 and/or an SLA, the auto tuner engine minimizes end to end latency while being at or below a predetermined threshold error rate.

In one embodiment, the auto tuner engine of FIG. 1 formulates the problem of optimizing the timeout and retry parameters in terms of a scalar reward value, provided in equation 1 below:

$$\text{reward} = \begin{cases} e^{-\text{excess latency}} - 1 & \text{if latency} > l, \\ 1 - \sum_i w_i e_i & \text{if latency} \leq l \end{cases} \quad \text{(Eq. 1)}$$

Where:

l is the end user or SLA specified latency;

$w_i$ is the weight of the $i^{th}$ link in the application; and $e_i$ is the error rate seen on the $i^{th}$ link in the application.

Accordingly, the multi objective optimization of equation 1 above provides a highest scalar reward value when the end to end latency is minimized for a given timeout error rate. For example, the above analysis provides the highest scalar reward value when the end to end latency is kept with the limit "1" in equation 1 and the error rates are minimized. The error rate is minimized subject to a constraint on latency. The system can also be used to minimize latency while keeping the error rate within a given limit. For example, different combinations of timeout and retry are used for each microservice independently, such that a highest reward value is achieved for a microservice-based application. In some embodiments, additional validation constraints, and/or confidence levels are used in the multi objective optimization. It will be understood that the multi objective optimization of equation 1 is provided here by way of example only, and not by way of limitation. Other multi objective optimization approaches can be used as well.

Various distributed tracing techniques, such as Zipkin and Istio Analytics can be used to identify the sources of delays in a microservices mesh of an application. For example, upon receiving a request for a resource from an end user 402, the gateway 404 can assign a unique identifier that is passed along with the request to each microservice. Each microservice may include a library that is used to identify the request's entry and exit ports for each microservice. Data is then transmitted back to a server (e.g., analytics server 116 of FIG. 1) that supports the distributed tracing technique. In this way, KPIs of each microservice can be identified and possibly stored in the reference data source 112. In the examples of FIGS. 4A and 4B, there are four interconnected microservices 410 to 416 to accommodate a microservice-based application. A distributed tracing tool can measure the length of time and the number of retries associated for each microservice. In this way, bottlenecks in the system can be identified and cured by appropriate settings of timeout and retry, as discussed herein.

Figure 5:
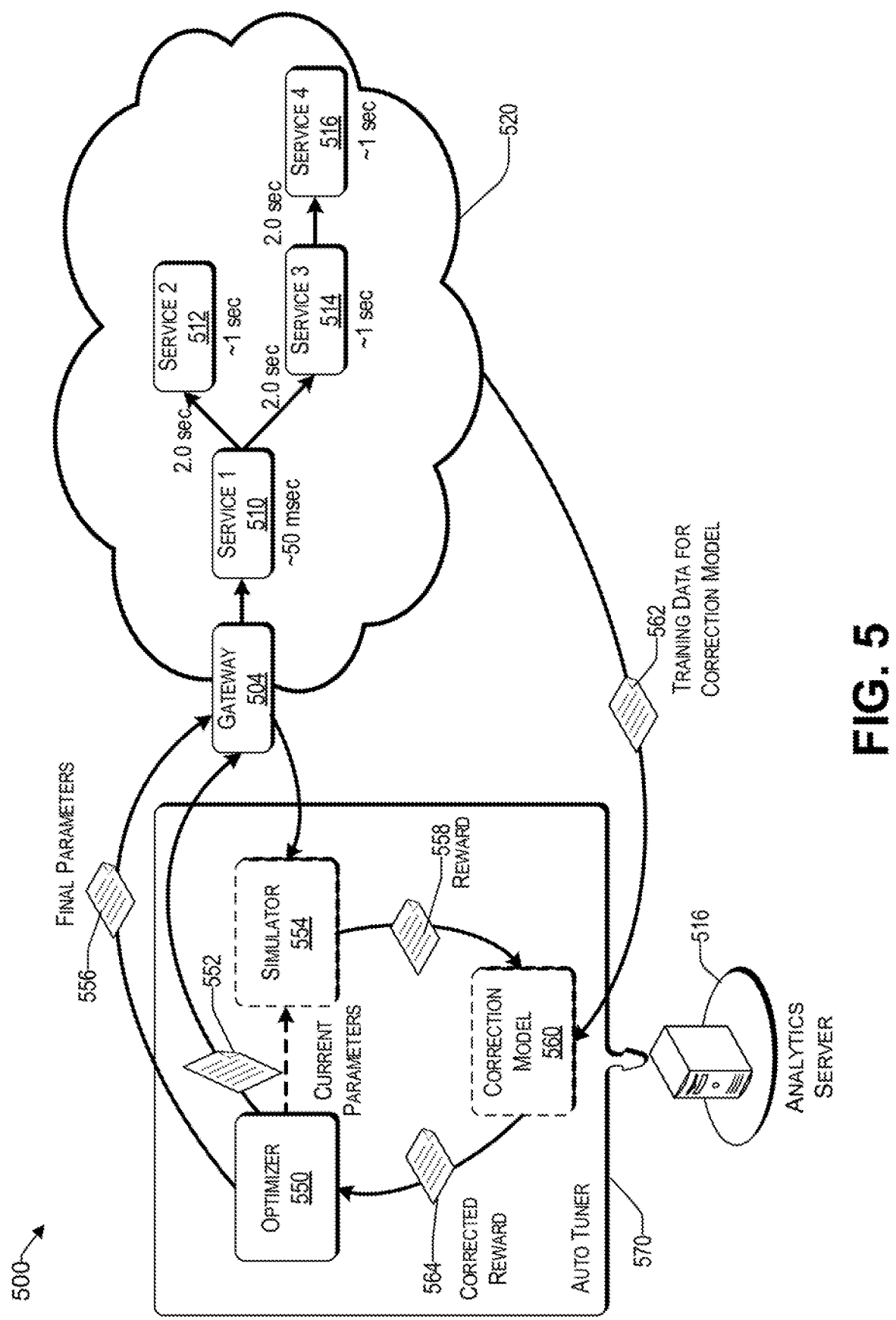
FIG. 5 is a conceptual block diagram of a system that uses an auto tuner engine to automatically adjust parameters of microservices implemented in a cloud.

Reference now is made to FIG. 5, which is a conceptual block diagram of a system 500 that uses an auto tuner engine to automatically adjust parameters of microservices implemented in a cloud. The system 500 includes an auto tuner engine 570 that runs on an analytic server 516. There is a cloud 520 that provides a service fabric of microservices (i.e., 510, 512, 514, and 516) for microservice-based applications. The gateway 504 is configured to receive API requests that are related to one or more microservices of the microservice-based applications. The gateway 504 also communicates with the auto tuner engine 570 of the analytics server 516 to provide various KPI's collected from the microservices of the cloud 520.

The auto tuner engine 570 includes an optimizer 550 that is configured to search for optimal parameters by way of a reward value discussed herein. To that end, black-box optimization or reinforcement learning techniques can be used to identify optimized timeout and retry values. In both these techniques, the scalar reward obtained from the application is treated as the feedback from the environment to the learning algorithm, and the space of parameters which the learner searches over is the space of feasible timeout and retry values for the application. In various embodiments, the auto tuner engine may test the different permutations 552 of the timeout and retry values directly on the microservice-based application via the gateway 504 or via an optional simulator 554 to determine the reward value given a set of parameters. In the black-box optimization approach, a simulator 554 approach is particularly useful when an actual evaluation of the different permutations of the microservice-based application would be too time consuming and/or computationally resource intensive. Instead, the simulator 554 may use a model of the microservice-based application to simulate the various permutations, which may be under different conditions, such as a best case (e.g., light load), a nominal case (e.g., normal or average conditions), worst case (e.g., heavy load), etc. In one embodiment, the model of the microservice-based application may be generated based on the training data 113 provided by the reference data source of FIG. 1. In this way, the effect of the different permutation of the parameter settings on end to end latency and error rates can be efficiently evaluated by the auto tuner engine 570.

In one embodiment, Monte Carlo simulations are used to explore the different permutations of timeout and retries. In particular, Monto Carlo simulations are used to estimate the reward value of the application for a given setting of timeout and retry parameters 558.

In one embodiment, there is a correction model 560 that is operative to correct the reward results 558 provided by the simulator 554. To that end, the correction model uses a machine learning model based on training data 562 from the actual microservice-based application. This model is learnt by initially trying a few different timeout and retry settings on both the simulator and the real application and then computing the simulated reward, as well as observing the real reward from the application. The correction model can be trained using machine learning techniques such as regression to predict the real-world reward based on the simulated reward by treating the real-world reward as a target and the simulated reward as one of the features used for reward prediction. Other features such as timeout and retry settings used to obtain this simulation reward can also be used for this prediction.

Upon the optimizer 550 determining at least the optimized timeout and retry parameters, the optimizer 550 sends the final parameters 556 to each corresponding microservice via the gateway 504. In this way, each microservice is optimized such that a lowest end to end latency is achieved, while a threshold error rate is not exceeded. In one embodiment, a lowest error rate is achieved while not exceeding a maximum threshold end to end latency. Accordingly, by virtue of optimizing at least the timeout and retry parameters of each identified microservice, the performance of a microservice-based application is improved while controlling the error rate.

Example Process

Figure 6:
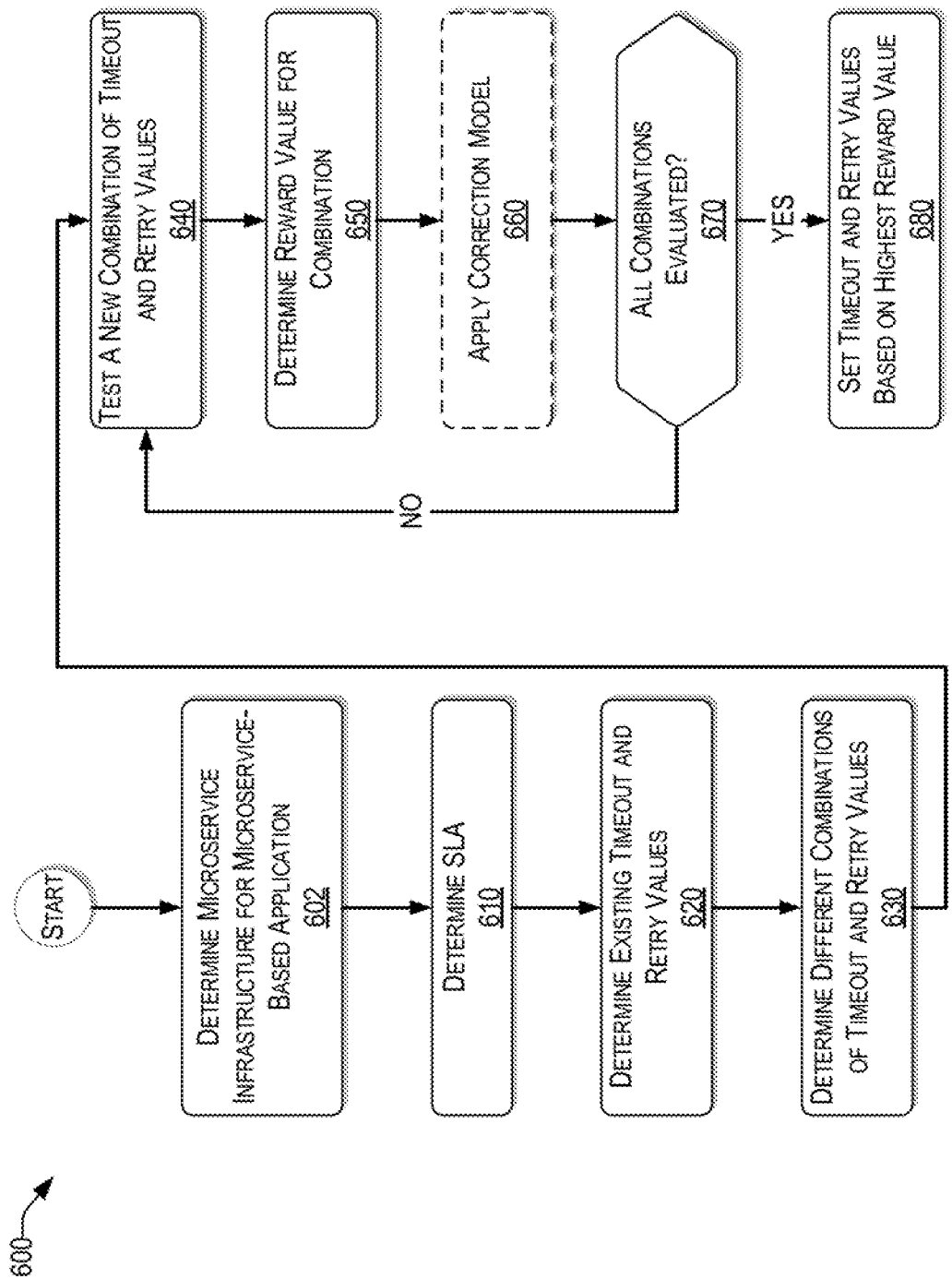
FIG. 6 presents a process for automatically tuning parameters of a microservice-based application, consistent with an illustrative embodiment.

With the foregoing overview of the example architecture 100, and systems 200 to 500, it may be helpful now to consider a high-level discussion of an example process. To that end, FIG. 6 presents a process 600 for automatically tuning parameters of a microservice-based application, consistent with an illustrative embodiment. Process 600 is illustrated as a collection of processes in a logical flowchart, wherein each block represents a sequence of operations that can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process. For discussion purposes, the process 600 is described with reference to the architecture 100 of FIG. 1.

At block 602, the auto tuner engine 110 of the analytics server 116 may determine a microservice infrastructure for a microservice-based application. For example, the microservices that are used for the microservices-based application as well as the interconnections between these microservices are identified.

At block 610, a service level agreement (SLA) is determined in connection with the microservice-based application. In various embodiments, the SLA may be received in a form of a data packet from an end user (e.g., in the context of a request for a resource (e.g., 103(1)) or from a business rules database. The SLA may be used to determine one or more optimization goals. For example, an optimization goal may be to have a lowest latency for a predetermined maximum error rate. In another example, the optimization goal may be to have a lowest error rate within a maximum threshold end to end latency.

At block 620, existing timeout and retry values for each identified microservice for the microservice-based application are determined. The existing timeout values may be under different conditions, such as a best case, a nominal case, a worst case, etc. In one embodiment, the existing timeout and retry values are determined from historical training data 113 received from a reference data source 112. In some embodiments, the existing timeout and retry values are actively determined.

At block 630, different combinations of timeout and retry values are prepared based on the determined existing timeout and retry values of block 620. To that end, in various embodiments, black-box optimization, gray box optimization, or reinforcement learning techniques are used to identify different combinations of timeout and retry values. In one embodiment, the combinations chosen are based on ranges that are within a predetermined distance of the average timeout and retry values for each identified microservice. In this way, unrealistic combinations can be avoided.

At block 640, an untried (e.g., new) combination of timeout and retry values of the prepared combinations of block 630 is tested. The testing can be performed directly on the microservice-based application on the cloud or by way of a simulator. In one embodiment, the auto tuner engine 110 estimates a length of time it would take to test each identified combination of timeout and retry value settings for the subject application. If the length of time is above a predetermined threshold, then a simulator is used, thereby saving time and/or computing resources of the cloud 120 hosting the microservices.

At block 650, a reward value is determined for the tested combination of timeout and retry values for the microservices of the microservice-based application.

In one embodiment, a correction model is used to correct the reward value result provided by the simulator. In this regard, at block 660, a correction model is applied to the data provided by the simulator to improve the accuracy of the reward value for the tested combination.

At block 670, the auto tuner engine 110 determines whether all combinations of timeout and retry values identified in block 630 have been tested. If not (i.e., "NO" at decision block 670), the process returns to block 640 to test a new combination of timeout and retry values. Upon determining that all combinations have been evaluated (i.e., "YES" at decision block 670), the process continues with block 680.

At block 680, the auto tuner engine 110 selects a combination of timeout and retry values for each of the microservices of the microservice-based application that provides a highest reward value. Consequently, each of the identified microservices is set to their tested corresponding timeout and retry values.

Example Computer Platform

Figure 7:
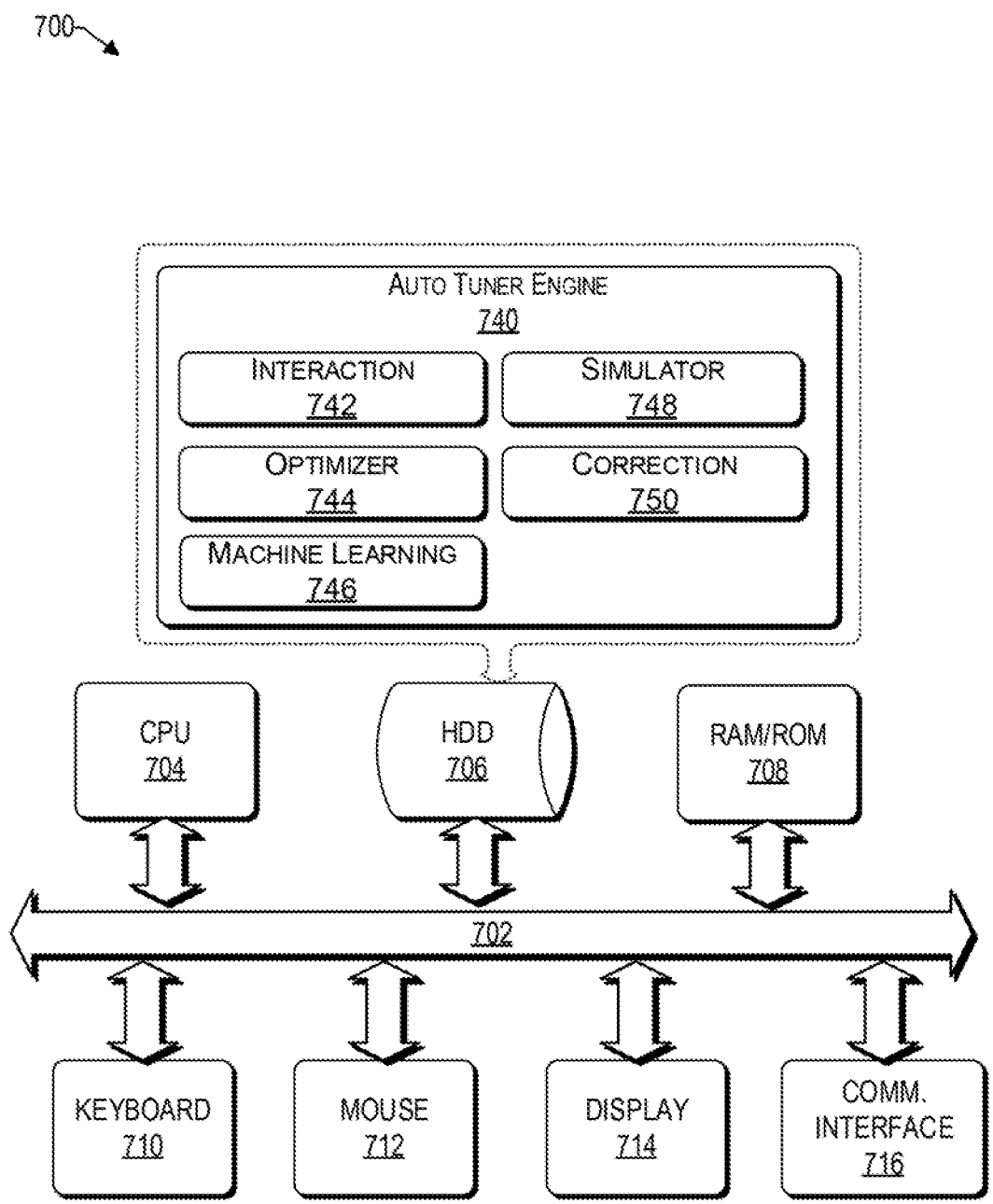
FIG. 7 is a functional block diagram illustration of a computer hardware platform that can communicate with various networked components.

As discussed above, functions relating to an efficient symbolic sequence analytics using random sequence embeddings can be performed with the use of one or more computing devices connected for data communication via wireless or wired communication, as shown in FIG. 1. FIG. 7 is a functional block diagram illustration of a computer hardware platform that can communicate with various networked components, such as a training input data source, the cloud, etc. In particular, FIG. 7 illustrates a network or host computer platform 700, as may be used to implement a server, such as the analytics server 116 of FIG. 1.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the auto tuner engine 740, in a manner described herein. The auto tuner engine 740 may have various modules configured to perform different functions. For example, there may be an interaction module 742 that is operative to interact with one or more computing devices or data sources, such as reference data source 112, to receive training or historic data 113 therefrom. The interaction module 742 is also operative to communicate with the services of the cloud 120, as discussed herein.

In one embodiment, there is an optimizer module 744 operative to optimize the timeout and retry parameters of each microservice of a microservice-based application. In various embodiments, the optimizer module 744 may interact with one or more other modules of the auto tuner engine 740 to provide black-box optimization, gray box optimization, or reinforcement learning techniques to identify different combinations of timeout and retry values.

In one embodiment, there is a machine learning module 746 operative to perform one or more machine learning techniques, such as support vector machine (SVM), logistic regression, neural networks, and the like, on the training data 113 and/or the results obtained from running the microservice based application under different timeout and retry values. For example, the machine learning module 746 can be used to create a simulator module 748 and/or a correction module 750.

Accordingly, there may be a simulator module 748 that is operative to emulate a performance of a microservice based application via a mathematical model. There may be a correction module 750 operative to correct a reward value result provided by the simulator 748 module.

In one embodiment, a program, such as Apache™, can be stored for operating the system as a Web server. In one embodiment, the HDD 706 can store an executing application that includes one or more library software modules, such as those for the Java™ Runtime Environment program for realizing a JVM (Java™ virtual machine).

Example Cloud Platform

As discussed above, functions relating to the automatic tuning of parameters of microservices of a microservice based application, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
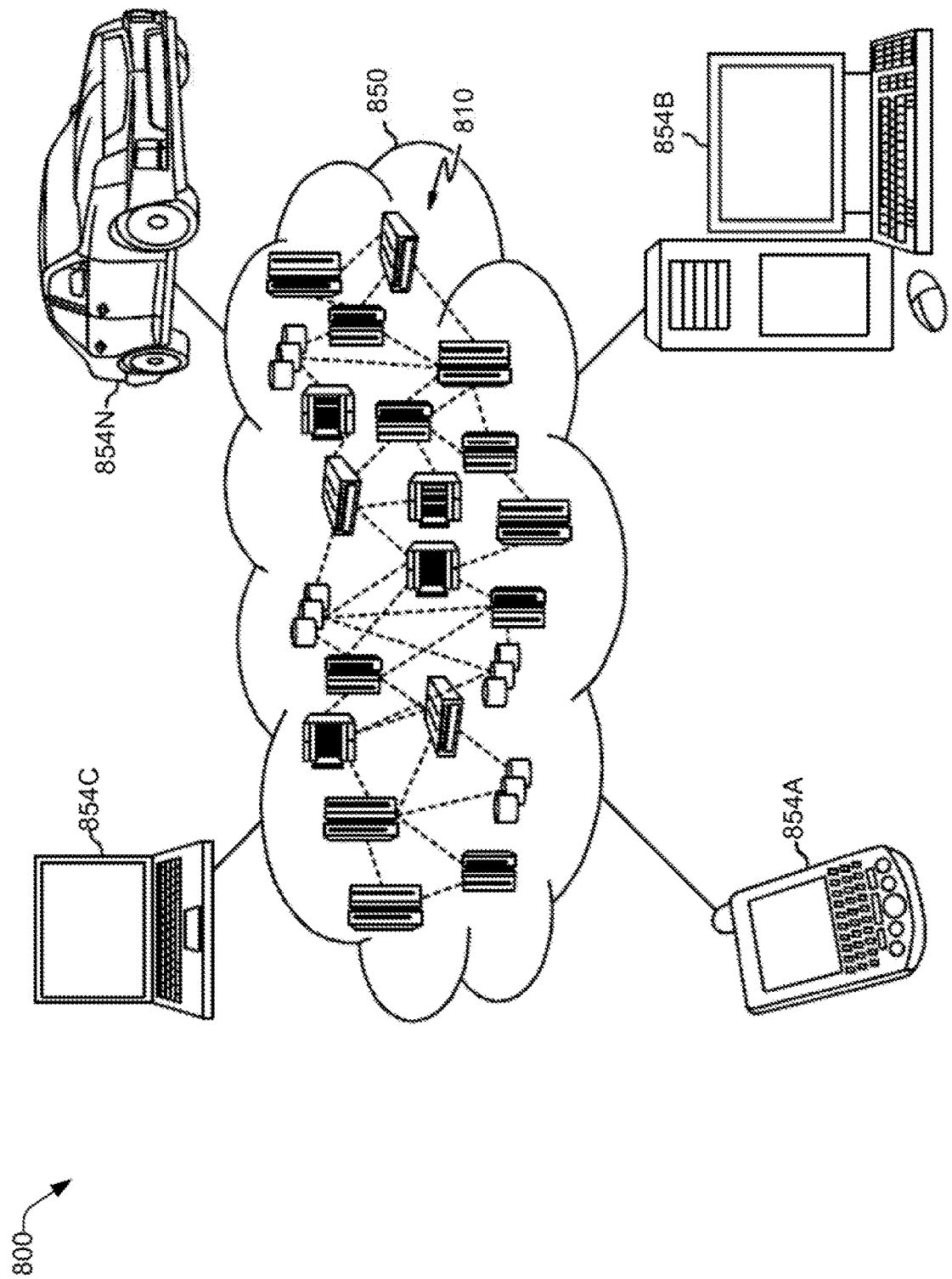
FIG. 8 depicts a cloud computing environment, consistent with an illustrative embodiment.

Referring now to FIG. 8, an illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, orHybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
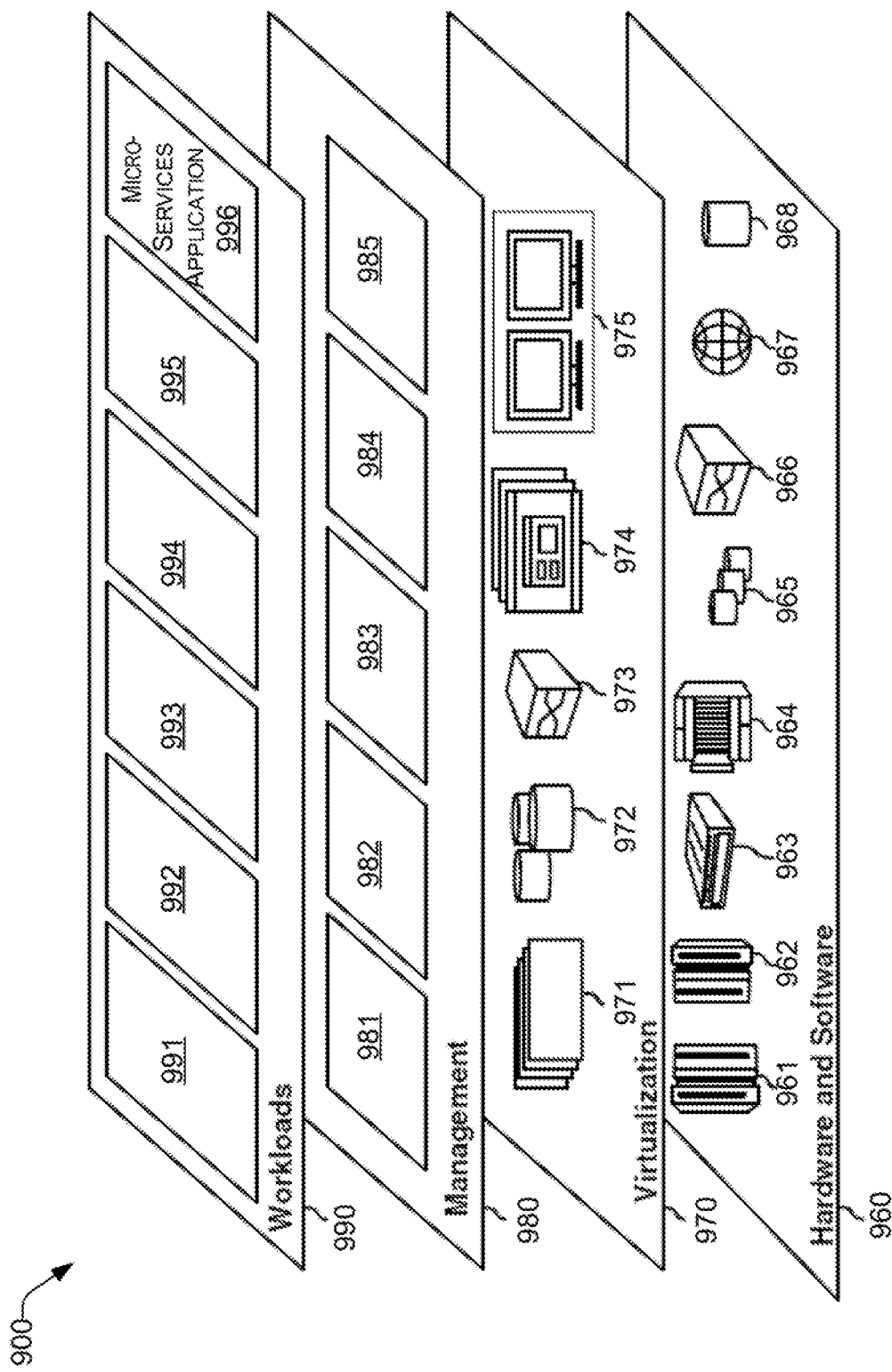
FIG. 9 depicts abstraction model layers, consistent with an illustrative embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and microservice-based applications 996, as discussed herein.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a storage device coupled to the processor;
an auto tuner engine stored in the storage device, wherein an execution of the auto tuner engine by the processor configures the computing device to perform acts comprising:
determining a microservice infrastructure of a microservice-based application;
determining one or more optimization objectives related to the microservice-based application;
testing different combinations of timeout and retry values for each microservice of the microservice-based application;
calculating a reward value for each of the different combinations of timeout and retry values; and
setting the microservice infrastructure to a combination of timeout and retry values having a highest reward value for the one or more optimization objectives.

2. The computing device of claim 1, wherein determining the microservice infrastructure of the microservice based application comprises:
identifying microservices used by the microservice-based application; and
identifying interconnections between the microservices.

3. The computing device of claim 1, wherein an optimization objective comprises a lowest end to end latency within a predetermined maximum error rate for the microservice-based application.

4. The computing device of claim 1, wherein an optimization objective comprises a lowest error rate within a predetermined maximum end to end latency for the microservice-based application.

5. The computing device of claim 1, wherein:
execution of the auto tuner engine further configures the computing device to perform acts comprising:
determining an existing timeout value for each microservice of the microservice-based application; and
determining an existing retry value for each microservice of the microservice-based application;
the existing timeout and retry values are based on a historical training data received from a reference data source; and
testing the different combinations of timeout and retry values for each microservice of the microservice-based application is based on the determined existing timeout and retry values.

6. The computing device of claim 1, wherein:
execution of the auto tuner engine further configures the computing device to perform acts comprising:
determining an existing timeout value for each microservice of the microservice-based application; and
determining an existing retry value for each microservice of the microservice-based application; and
the existing timeout and retry values for each microservice are based on the microservice operating under a heavy load that is above a typical load.

7. The computing device of claim 1, wherein the one or more optimization objectives are from a service level agreement (SLA) that is received in a data packed from an end user of the microservice-based application.

8. The computing device of claim 1, wherein the testing of each of the different combinations of timeout and retry values is via a simulator of the microservice-based application.

9. The computing device of claim 1, wherein the testing of each of the different combinations of timeout and retry values comprises: testing each combination directly on the microservice-based application.

10. The computing device of claim 1, wherein the testing of the different combinations of timeout and retry values comprises:
estimating a length of time to test the created different combinations of timeout and retry values directly on the microservice-based application;
upon determining that the length of time is at or below a predetermined threshold, testing each of the different combinations of timeout and retry values directly on the microservice-based application; and
upon determining that the length of time is above a predetermined threshold, using a simulator to emulate a performance of the microservice-based application for each of the different combinations of timeout and retry values.

11. The computing device of claim 1, wherein the different combinations of timeout and retry values for each microservice are created by at least one of: (i) black-box optimization, (ii) gray-box optimization, and (iii) reinforcement learning techniques.

12. The computing device of claim 1, wherein, for each microservice of the microservice based application, the setting of the timeout value is increased after each retry.

13. The computing device of claim 1, wherein execution of the auto tuner engine further configures the computing device to perform acts comprising: applying a correction model to each determined reward value, wherein the correction model takes the determined reward value as input and yields a new estimate of the reward value as output based on statistical and machine learning techniques.

14. A non-transitory computer readable storage medium tangibly embodying a computer readable program code having computer readable instructions that, when executed, causes a computer device to carry out a method of optimizing parameters of a microservice-based application, the method comprising:
    determining a microservice infrastructure of the microservice-based application;
    determining one or more optimization objectives related to the microservice-based application;
    testing different combinations of timeout and retry values for each microservice of the microservice-based application;
    calculating a reward value for each of the different combinations of timeout and retry values; and
    setting the microservice infrastructure to a combination of timeout and retry values having a highest reward value for the one or more optimization objectives.

15. The non-transitory computer readable storage medium of claim 14, wherein determining the microservice infrastructure of the microservice based application comprises:
    identifying microservices used by the microservice-based application; and
    identifying interconnections between the microservices.

16. The non-transitory computer readable storage medium of claim 14, wherein an optimization objective comprises a lowest end to end latency within a predetermined maximum error rate for the microservice-based application.

17. The non-transitory computer readable storage medium of claim 14, wherein an optimization objective comprises a lowest error rate within a predetermined maximum end to end latency for the microservice-based application.

18. The non-transitory computer readable storage medium of claim 14, further comprising:
    determining an existing timeout value for each microservice of the microservice-based application; and
    determining an existing retry value for each microservice of the microservice-based application,
    wherein the existing timeout and retry values are based on a historical training data received from a reference data source, and
    wherein testing the different combinations of timeout and retry values for each microservice of the microservice-based application is based on the determined existing timeout and retry values.

19. The non-transitory computer readable storage medium of claim 14, further comprising:
    determining an existing timeout value for each microservice of the microservice-based application; and
    determining an existing retry value for each microservice of the microservice based application, wherein the existing timeout and retry values for each microservice is based on the microservice operating under a heavy load that is above a typical load.

20. The non-transitory computer readable storage medium of claim 14, wherein the testing of each of the different combinations of timeout and retry values is via a simulator of the microservice-based application.

21. The non-transitory computer readable storage medium of claim 14, wherein the testing of each of the different combinations of timeout and retry values comprises: testing each combination directly on the microservice-based application.

22. The non-transitory computer readable storage medium of claim 14, wherein the testing of the different combinations of timeout and retry values comprises:
    estimating a length of time to test the created different combinations of timeout and retry values directly on the microservice-based application;
    upon determining that the length of time is at or below a predetermined threshold, testing each of the different combinations of timeout and retry values directly on the microservice-based application; and
    upon determining that the length of time is above a predetermined threshold, using a simulator to emulate a performance of the microservice-based application for each of the different combinations of timeout and retry values.

23. The non-transitory computer readable storage medium of claim 14, wherein the different combinations of timeout and retry values for each microservice are created by at least one of: (i) black-box optimization, (ii) gray-box optimization, and (iii) reinforcement learning techniques.

24. The non-transitory computer readable storage medium of claim 14, wherein, for each microservice of the microservice based application, the setting of the timeout value is increased after each retry.

25. The non-transitory computer readable storage medium of claim 14, further comprising: applying a correction model to each determined reward value, wherein the correction model takes the determined reward value as input and yields a new estimate of the reward value as output based on statistical and machine learning techniques.

* * * * *